(12) United States Patent
Kawahara et al.

(10) Patent No.: US 11,566,350 B2
(45) Date of Patent: Jan. 31, 2023

(54) REINFORCING FIBER MAT MANUFACTURING APPARATUS

(71) Applicant: Toray Industries, Inc., Tokyo (JP)

(72) Inventors: Yoshihiro Kawahara, Otsu (JP);
Takashi Ikushima, Otsu (JP);
Yasumoto Noguchi, Ehime (JP);
Tamotsu Suzuki, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 0 days.

(21) Appl. No.: 16/962,079

(22) PCT Filed: Jan. 17, 2019

(86) PCT No.: PCT/JP2019/001217
§ 371 (c)(1),
(2) Date: Jul. 14, 2020

(87) PCT Pub. No.: WO2019/142851
PCT Pub. Date: Jul. 25, 2019

(65) Prior Publication Data
US 2020/0340146 A1 Oct. 29, 2020

(30) Foreign Application Priority Data
Jan. 17, 2018 (JP) .............................. JP2018-005259

(51) Int. Cl.
*D01G 9/04* (2006.01)
*D01G 9/18* (2006.01)
*D01G 11/00* (2006.01)

(52) U.S. Cl.
CPC ................ *D01G 9/04* (2013.01); *D01G 9/18* (2013.01); *D01G 11/00* (2013.01)

(58) Field of Classification Search
CPC .. D01G 9/04; D01G 9/18; D01G 9/24; D01G 11/00; D01G 25/00; D01G 23/02; D01G 23/04; D04H 1/736
See application file for complete search history.

(56) References Cited

U.S. PATENT DOCUMENTS 3,233,836 A * 2/1966 Merges ..................... B07B 1/24
241/60
3,777,231 A * 12/1973 Guschin ................. D01G 15/46
361/213

(Continued)

FOREIGN PATENT DOCUMENTS

CN    106554152 A *  4/2017
GB       734470      8/1955

(Continued)

OTHER PUBLICATIONS

International Search Report and Written Opinion for International Application No. PCT/JP2019/001217, dated Mar. 12, 2019, 4 pages.

*Primary Examiner* — Shaun R Hurley
*Assistant Examiner* — Aiying Zhao
(74) *Attorney, Agent, or Firm* — RatnerPrestia (57) ABSTRACT

A reinforcing fiber mat manufacturing apparatus according to the present invention is a reinforcing fiber mat manufacturing apparatus that includes a hitting mechanism (40) that comes into contact with a reinforcing fiber bundle to split the reinforcing fiber bundle into a plurality of pieces, and, disperses the plurality of pieces. The hitting mechanism (40) includes a rotation shaft (41), a pair of rotation plates (42) attached to portions of the rotation shaft (41) apart from each other, and a plurality of hitting pieces (43) arranged to extend in parallel to the rotation shaft (41) between the pair of rotation plates (42). The reinforcing fiber mat manufacturing apparatus according to the present invention is a simple apparatus that reliably hits a reinforcing fiber bundle (Continued)

to split the fiber bundle into thin bundles, and disperses the thin bundles to a wide range without causing air turbulence to manufacture a reinforcing fiber mat having a uniform fiber basis weight.

8 Claims, 6 Drawing Sheets

(56) References Cited

U.S. PATENT DOCUMENTS

| | | | | | |
|---|---|---|---|---|---|
| 4,355,438 | A | * | 10/1982 | Reeves, Jr. | ............... D04H 1/00 19/0.51 |
| 4,501,047 | A | * | 2/1985 | Wrassman | ............. D01G 13/00 19/145.5 |
| 5,038,975 | A | * | 8/1991 | Weder | ................... D01G 23/04 222/56 |
| 5,245,728 | A | * | 9/1993 | Rupp | ..................... D01G 23/02 19/148 |
| 5,466,188 | A | * | 11/1995 | Schaal | ..................... D01B 1/14 460/68 |
| 2007/0124894 | A1 | * | 6/2007 | Drapela | .................... D04H 1/72 19/296 |
| 2010/0283176 | A1 | * | 11/2010 | Eriksen | .................... D04H 1/72 264/175 |
| 2014/0299252 | A1 | * | 10/2014 | Abe | ......................... D04H 1/74 156/62.2 |
| 2016/0215422 | A1 | | 7/2016 | Rademacker et al. | |

FOREIGN PATENT DOCUMENTS

| | | | | |
|---|---|---|---|---|
| GB | 734470 | A | * 8/1955 | ................ D01G 9/00 |
| JP | 45001359 | B | 1/1970 | |
| JP | 3630221 | B2 | 3/2005 | |
| WO | 9936623 | A1 | 7/1999 | |
| WO | 2014177497 | A1 | 11/2014 | |

* cited by examiner

|   | 1 | 2 | 3 | 4 | 5 | 6 | 7 | 8 | 9 | 10 | 11 | 12 | 13 | 14 | 15 |
|---|---|---|---|---|---|---|---|---|---|----|----|----|----|----|----|
| 1 | O |   |   |   |   |   |   |   |   |    | O  |    |    |    |    |
| 2 |   |   |   |   |   |   |   | O |   |    |    |    |    |    |    |
| 3 |   |   |   | O |   |   |   |   |   |    |    |    |    | O  |    |

↑ Sheet member transportation direction
In columns

→ Mat width direction
In rows

REINFORCING FIBER MAT MANUFACTURING APPARATUS

CROSS REFERENCE TO RELATED APPLICATIONS

This is the U.S. National Phase application of PCT/JP2019/001217, filed Jan. 17, 2019, which claims priority to Japanese Patent Application No. 2018-005259, filed Jan. 17, 2018, the disclosures of each of these applications being incorporated herein by reference in their entireties for all purposes

FIELD OF THE INVENTION

The present invention relates to a manufacturing apparatus that manufactures a reinforcing fiber mat including thinly split and uniformly dispersed reinforcing fiber bundles.

BACKGROUND OF THE INVENTION

Fiber-reinforced plastics made of reinforcing fiber and matrix resin, which have excellent mechanical properties such as high specific intensity or high specific modulus, have been widely used for industrial purposes. Among these purposes, a technology known for the purpose of forming a complex shape is to manufacture a formed product with a desired shape by heating or compression molding a forming material including discontinuous reinforcing fiber (for example, carbon fiber) and matrix resin. Main examples of such a formed product include a sheet molding compound (SMC) and a stampable sheet.

The characteristics of a reinforcing fiber mat including randomly dispersed multiple reinforcing fibers significantly affect the mechanical properties of fiber-reinforced plastics including discontinuous reinforcing fiber. The mechanical properties of fiber-reinforced plastics are significantly affected by the variance in fiber bundle thickness or fiber basis weight in the reinforcing fiber mat. Thus, splitting a fiber bundle into pieces with a desired bundle thickness and uniformly dispersing the split pieces of the fiber bundle are important for manufacturing a high-quality reinforcing fiber mat.

Regarding a method for dispersing reinforcing fiber bundles, Patent document 1 and Patent document 2 describe a dispersing method including hitting a strand by rotating thread hitting pieces extending radially from the rotation shaft, splitting the strand, and dispersing the split strand.

Patent document 3 describes a method for dispersing a fiber bundle with an air nozzle.

PATENT DOCUMENTS

Patent document 1: WO2014/177497
Patent document 2: WO1999/036623
Patent document 3: US2016/0215422

SUMMARY OF THE INVENTION

The methods described in Patent document 1 and Patent document 2 fail to hit a fiber bundle when the fiber bundle deviates into a gap between hitting pieces. To avoid this, the thread hitting pieces need to be highly densely arranged, need to have a complex shape, or need to take other countermeasures. Thus, the rotating portion of the dispersing device may have a complex and solid shape.

The method described in Patent document 3 may cause air ejected from the air nozzle to disturb air inside a dispersion booth. Specifically, when an amount of air ejection is increased to securely split the fiber bundles, air current in the dispersion booth is disturbed, and thus the accuracy of the fiber basis weight of the reinforcing fiber mat is reduced.

The present invention pays an attention to the above problem, and aims to provide a simple apparatus that manufactures a reinforcing fiber mat having a uniform fiber basis weight by reliably hitting a reinforcing fiber bundle to split the fiber bundle into thin bundles and dispersing the thin bundles to a wide range without causing air turbulence.

To solve the above problems, the present invention according to exemplary embodiments is formed as follows.

(1) A reinforcing fiber mat manufacturing apparatus includes a hitting mechanism that comes into contact with a reinforcing fiber bundle to split the reinforcing fiber bundle into a plurality of pieces, and disperses the plurality of pieces, wherein the hitting mechanism includes a rotation shaft, a pair of rotation plates attached to portions of the rotation shaft apart from each other, and a plurality of hitting pieces arranged to extend in parallel to the rotation shaft between the pair of rotation plates.

(2) The reinforcing fiber mat manufacturing apparatus according to (1), wherein the pair of rotation plates have a disk shape, and the plurality of hitting pieces are arranged to be concentric around the rotation shaft.

(3) The reinforcing fiber mat manufacturing apparatus according to (1) or (2), wherein partitioning rotation plates are attached to the rotation shaft between the pair of rotation plates, and the plurality of hitting pieces are disposed between an adjacent one of the rotation plates and one of the partitioning rotation plates or between adjacent two of the partitioning rotation plates.

(4) The reinforcing fiber mat manufacturing apparatus according to (1) to (3), wherein the hitting pieces have a diameter of smaller than 3 mm.

(5) The reinforcing fiber mat manufacturing apparatus according to (1) to (4), wherein the hitting mechanism is disposed in a dispersion booth to which the rotation shaft is attached, the dispersion booth has a dispersion opening below the hitting mechanism, and the dispersion booth accommodates a plurality of dispersion booth partition plates extending in a direction orthogonal to an axial direction of the rotation shaft and arranged in the axial direction.

(6) The reinforcing fiber mat manufacturing apparatus according to (1) to (5), wherein the dispersion booth has a fall opening above the hitting mechanism, the fall opening is connected with the chute, and the chute accommodates a plurality of chute partition plates extending in a direction orthogonal to an axial direction of the rotation shaft, and arranged in the axial direction.

The apparatus according to embodiments of the present invention is a simple device that can manufacture a reinforcing fiber mat with a uniform fiber basis weight by reliably hitting a reinforcing fiber bundle to split the fiber bundle into thin bundles, and dispersing the thin bundles into a wide range without causing air turbulence.

BRIEF DESCRIPTION OF DRAWINGS

FIG. 8(A) is a front view, and FIG. 8(B) is a side view.

FIG. 9(A) is a front view, and FIG. 9(B) is a side view.

FIG. 10(A) is a front view, and FIG. 10(B) is a side view.

DETAILED DESCRIPTION OF EMBODIMENTS OF THE INVENTION

Embodiments of the present invention will be described with reference to the drawings. The present invention, however, is not limited to these embodiments. The description of each embodiment can be concurrently construed as a manufacturing method or a manufacturing apparatus of the present invention, which is a superordinate concept.

Figure 1:
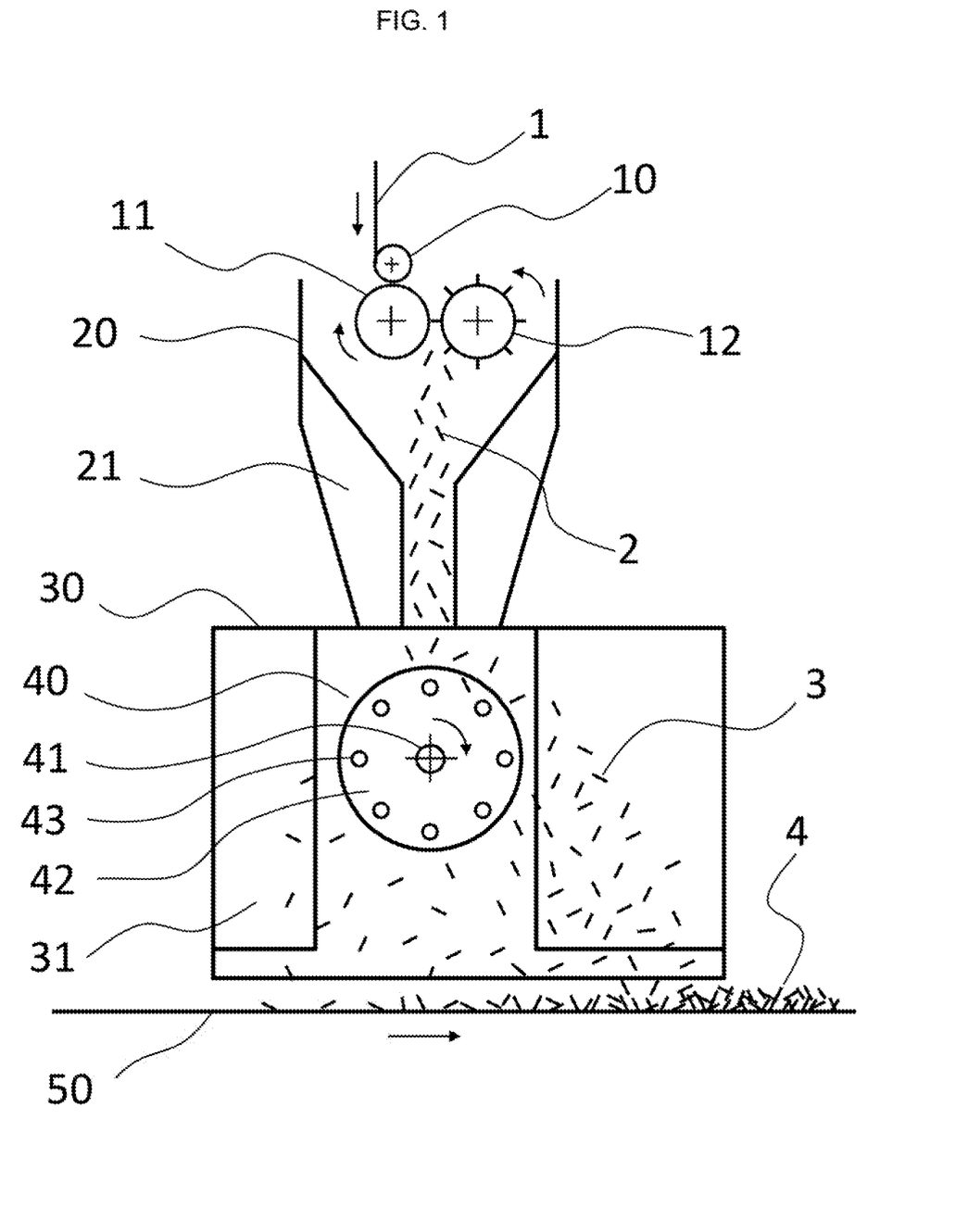
FIG. 1 is a cross-sectional view of an example of a reinforcing fiber mat manufacturing apparatus according to an embodiment of the present invention, viewed from the front.
Figure 2:
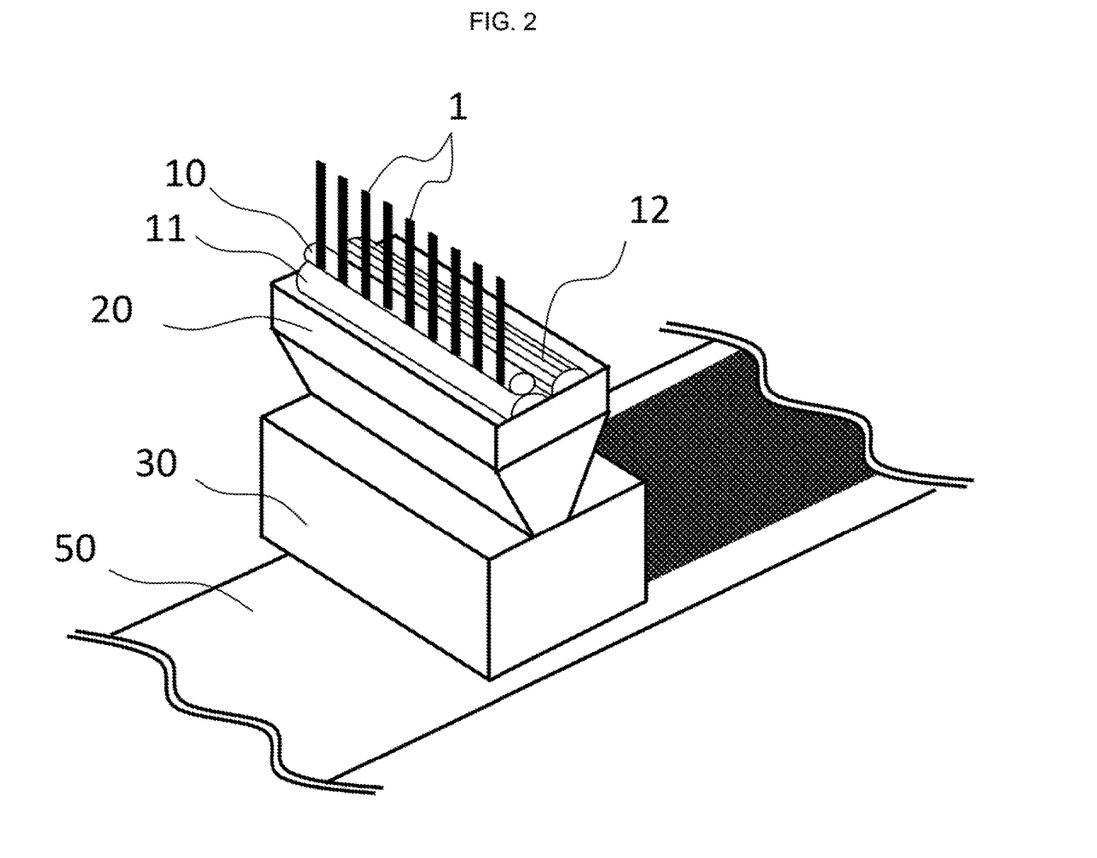
FIG. 2 is a perspective view of an example of the reinforcing fiber mat manufacturing apparatus according to an embodiment of the present invention.
Figure 3:
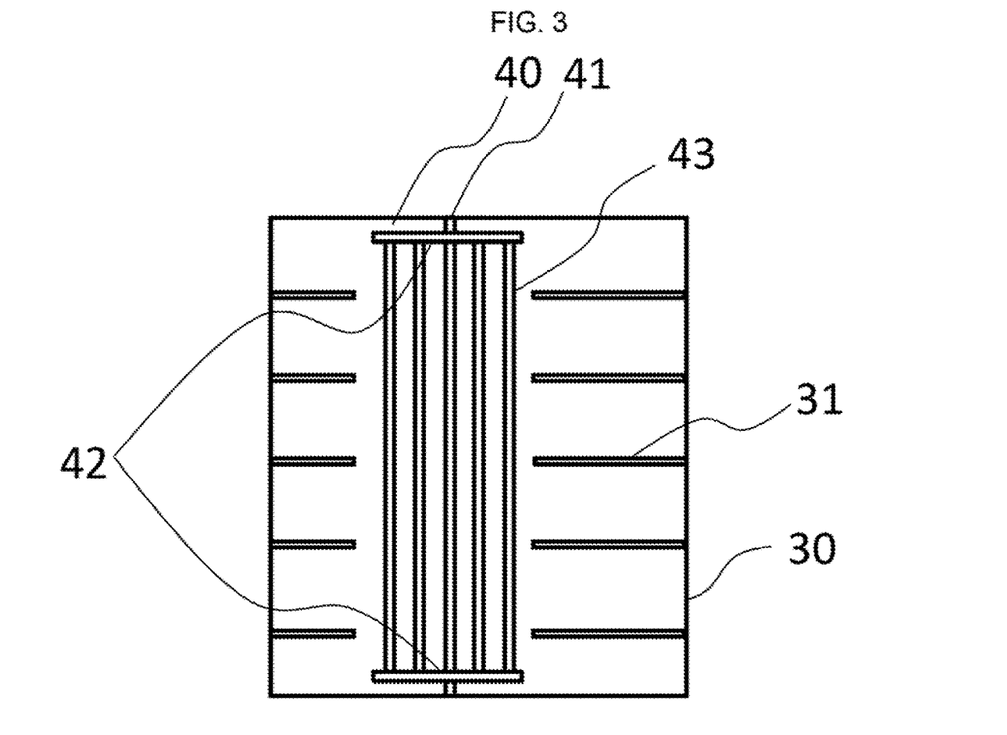
FIG. 3 is a bottom view of an example of the reinforcing fiber mat manufacturing apparatus according to an embodiment of the present invention.
Figure 4:
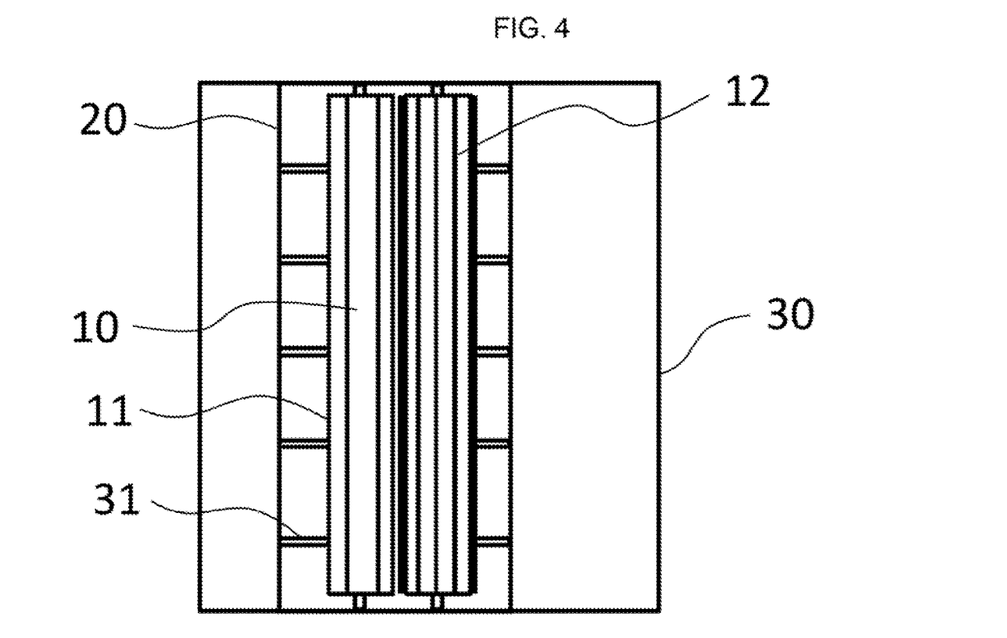
FIG. 4 is a top view of an example of the reinforcing fiber mat manufacturing apparatus according to an embodiment of the present invention.

FIGS. 1, 2, 3, and 4 illustrate an example of a reinforcing fiber mat manufacturing apparatus according to an embodiment of the present invention. FIG. 1 is a cross-sectional view of the reinforcing fiber mat manufacturing apparatus, viewed from the front, FIG. 2 is an external view of the reinforcing fiber mat manufacturing apparatus, FIG. 3 is a bottom view of the reinforcing fiber mat manufacturing apparatus, and FIG. 4 is a top view of the reinforcing fiber mat manufacturing apparatus. The reinforcing fiber mat manufacturing apparatus includes a guide roller 10 at the top, which guides reinforcing fiber bundle 1, and a nip roller 11 and a cutter roller 12, immediately under the guide roller 10. An operating mechanism, not shown, can press the nip roller 11 and the cutter roller 12 against each other, or keep the nip roller 11 and the cutter roller 12 away from each other.

The reinforcing fiber mat manufacturing apparatus also includes a tubular chute 20 around and below the nip roller 11 and the cutter roller 12. The chute 20 is connected to a dispersion booth 30 below, through a fall opening. The dispersion booth 30 accommodates a hitting mechanism 40, which hits fiber bundles. The hitting mechanism 40 includes a rotation shaft 41, which is rotated by a rotation mechanism not shown, a pair of rotation plates 42, which are connected to the rotation shaft 41 and rotate together with the rotation shaft 41, and multiple linear hitting pieces 43 stretched in parallel to the rotation shaft 41 between the pair of rotation plates 42.

To manufacture a reinforcing fiber mat with the above apparatus, the reinforcing fiber bundle 1 is guided to the nip roller 11 via the guide roller 10, and the reinforcing fiber bundle 1 is cut between the nip roller 11 and the cutter roller 12 pressed against each other by an operating mechanism not shown, to be formed into cut reinforcing fiber bundles 2.

Subsequently, the cut reinforcing fiber bundles 2 fall through the chute 20 and then the fall opening into the dispersion booth 30, and come into contact with the hitting pieces 43 stretched in the rotating hitting mechanism 40 to be split into multiple reinforcing fiber bundles 3, thinner than before the contact. The split reinforcing fiber bundles 3 are dispersed to a wider range than before the contact. The split reinforcing fiber bundles 3 pass through a dispersion opening below the dispersion booth 30, and fall and accumulate on a sheet member 50, which moves unidirectionally, to form a reinforcing fiber mat 4.

As will be described in details with reference to FIG. 3, the hitting pieces 43 are substantially regularly arranged in parallel to the direction of the rotation shaft 41. The hitting pieces 43 are highly likely to come into contact with and hit the falling cut reinforcing fiber bundles 2, and thus can reliably split an original reinforcing fiber bundle introduced in the apparatus, into multiple thin reinforcing fiber bundles. The shape of the pair of rotation plates 42 that fix the hitting pieces 43 is not limited to a completely flat shape. The pair of rotation plates 42 may have any shape that can fix each of the hitting pieces at at least two positions spaced apart from each other along the rotation shaft, and that can transmit rotation of the shaft to the hitting pieces. However, the pair of rotation plates 42 preferably have a disk shape that allows the hitting pieces 43 to thoroughly hit and split the cut reinforcing fiber bundles 2 while the hitting mechanism 40 is rotated. Preferably, the hitting pieces 43 are arranged along the outer circumferences of the pair of rotation plates 42 to be concentric around the rotation shaft 41. Three or more hitting pieces 43 are preferably arranged, and about six to sixteen hitting pieces are more preferable.

The hitting pieces 43 may have a plate shape or a stick shape with a circular or polygonal cross section as long as they continuously extend in parallel to the axis of the rotation shaft 41, and the shape of the hitting pieces 43 is not limited to a particular one. As described in the embodiments, preferably, the hitting pieces 43 have a thin linear shape with, preferably, a line diameter of smaller than 3 mm, or more preferably, smaller than or equal to 1.5 mm. Instead of a circular cross section, the cross-sectional shape of the linear material may be selectable from various different shapes including a polygonal cross section and a cross section with a shape obtained by mixing a polygon and an arc. Preferably, the linear material may have such a thickness that the diameter of the maximum circumcircle that encloses the cross section is smaller than 3 mm, or more preferably smaller than or equal to 1.5 mm. Although the lower limit of the thickness is not limited to a particular one, preferably, the thickness is larger than or equal to 0.3 mm, so that the hitting pieces 43 are thick enough to be able to reliably come into contact with and split the falling cut reinforcing fiber bundles 2 without being easily deformed by the rotation of the hitting mechanism 43. Preferably, the hitting pieces 43 are made of high-strength steel resistant to repeated collision with the reinforcing fiber bundles 2 without being worn or broken for a long time. Other examples usable as a linear material include various types of synthetic fiber and natural fiber.

The hitting pieces 43 thus having a thin linear shape can reduce the surface area over which they come into contact with air, and thus reduce the occurrence of accompanying air current resulting from the rotation of the hitting pieces 43 to a minimum. Thus, air turbulence caused in the booth 30, particularly, air current flowing in the direction of the rotation shaft 41 can be reduced.

As shown in FIG. 2, preferably, multiple reinforcing fiber bundles 1 are inserted into the reinforcing fiber mat manufacturing apparatus at a regular pitch in the apparatus width direction (the width direction is defined as the direction in which the rotation axis of the cutter roller 12 or the rotation shaft 41 extends). As described above, air current in the direction of the rotation shaft 41 in the dispersion booth 30 is reduced. Thus, the inserted reinforcing fiber bundle 1 is split and dispersed to fall while keeping the basis-weight distribution uniform in the width direction, so that a reinforcing fiber mat 4 with high basis-weight accuracy can be obtained. In addition, reduction of accompanying air current prevents a phenomenon where the cut reinforcing fiber bundles 2 are blown by wind caused by the accompanying air current before coming into contact with the hitting pieces 43 to fail to come into contact with the hitting pieces 43. As the hitting pieces 43 become thinner, the hitting pieces 43 can hit smaller spots, instead of the entirety of the cut reinforcing fiber bundles 2, so that the hitting pieces 43 can more reliably split the cut reinforcing fiber bundles 2.

Figure 5:
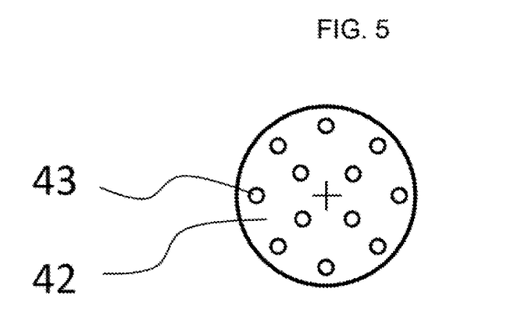
FIG. 5 is a cross-sectional view of an arrangement example of hitting pieces according to an embodiment of the present invention, viewed from the front.

Instead of being necessarily completely parallel to the rotation axis, the hitting pieces 43 may have a shape slightly crooked or inclined with respect to the rotation axis as long as they are continuous with the rotation axis in a substantially parallel direction. As shown in FIG. 5, the hitting pieces 43 may be arranged on multiple concentric circles with different diameters while being spaced at different angles. Although not necessarily have to be spaced at equal angles, more preferably, the hitting pieces 43 are spaced at equal angles on concentric circles, since such a structure when functioning as a rotator has a good balance in weight and more likely to stably rotate at a high speed.

Figure 6:
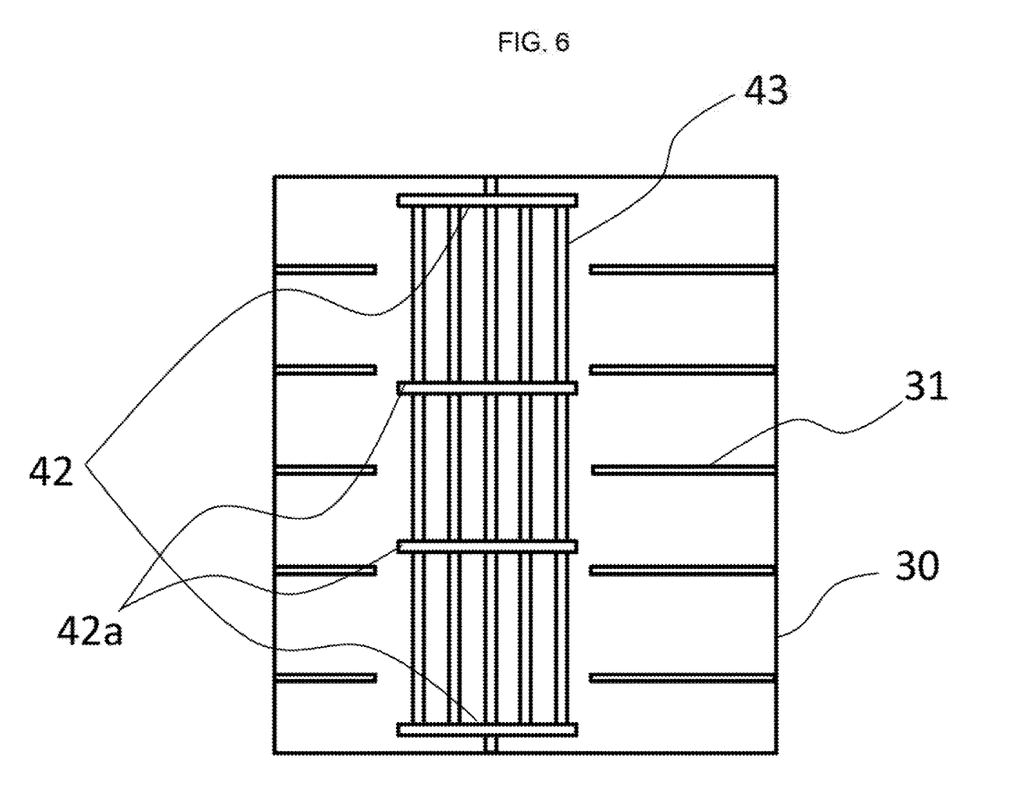
FIG. 6 is a bottom view of an arrangement example of hitting pieces according to an embodiment of the present invention.

As shown in FIG. 6, each of the hitting pieces 43 may be supported by multiple partitioning rotation plates 42a at the middle, by extending through the partitioning rotation plates 42a, while continuously extending throughout in the rotation axis direction (connected to the pair of rotation plates 42). Such a support prevents the hitting pieces 43 from receiving a centrifugal force with the rotation, and from sagging away from the rotation shaft 41. This structure can thus stabilize the direction in which the cut reinforcing fiber bundles 2 are dispersed when hit, and can thus maintain high basis-weight accuracy of the reinforcing fiber mat.

Figure 7:
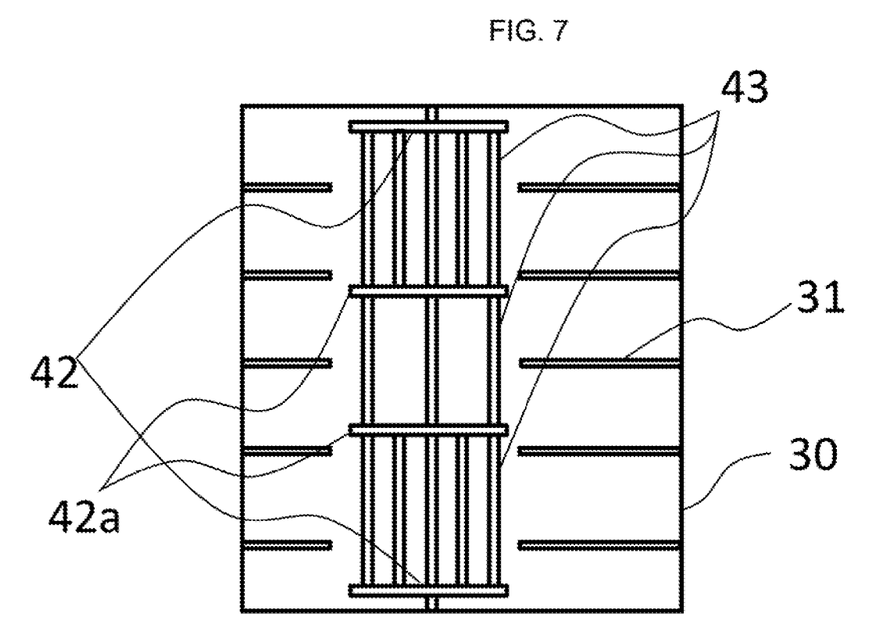
FIG. 7 is a bottom view of another arrangement example of hitting pieces according to an embodiment of the present invention.

As shown in FIG. 7, partitioning rotation plates 42a may be attached between the pair of rotation plates 42, and the hitting pieces 43 may be disposed between the adjacent rotation plate and any partitioning rotation plate or between adjacent partitioning rotation plates. Specifically, the hitting pieces 43 may end in the middle between the pair of rotation plates 42. The number of hitting pieces 43 arranged between the rotation plates 42 or the partitioning rotation plates 42a may be changed as appropriate.

The above-described embodiment preferably includes chute partition plates 21 in the chute 20 and dispersion booth partition plates 31 in the dispersion booth 30. The chute partition plates 21 and the dispersion booth partition plates 31 split at least part of the inside space into multiple areas with surfaces orthogonal to the rotation axes of the hitting pieces 43. Such partition plates can interrupt air current flowing in the direction of the rotation shaft 41 or the apparatus width direction, inside the chute 20 or the dispersion booth 30, caused by accompanying current caused by the rotation of the hitting pieces 43 and the rotation plate 42. This structure can thus prevent the split reinforcing fiber bundles 3 from unnecessarily moving in the width direction, and can maintain high basis-weight accuracy of the reinforcing fiber mat.

EXAMPLES

Hereinafter, the present invention will be described in detail using examples and comparative examples, but the present invention is not limited to the following description. The following describes a fiber bundle used as examples, apparatus structures, conditions in common, an evaluation method, and examples and comparative examples.

(Fiber Bundle)

Carbon fiber "PX3505015T-13" manufactured by ZOLTEK is used.

The number of filaments is 50K (*) at a fineness of 3.7 g/m with a width of 12 mm, where (*) 50K denotes 50,000 filaments. Hereinafter, the number of filaments (n×1000) is denoted in "nK".

(Apparatus Structure 1) [Linear Blade Roller]

This apparatus structure 1 is the reinforcing fiber mat manufacturing apparatus shown in FIGS. 1, 2, 3, and 4 as a basic structure. However, the structure excludes the shown dispersion booth partition plates.

Figure 10:
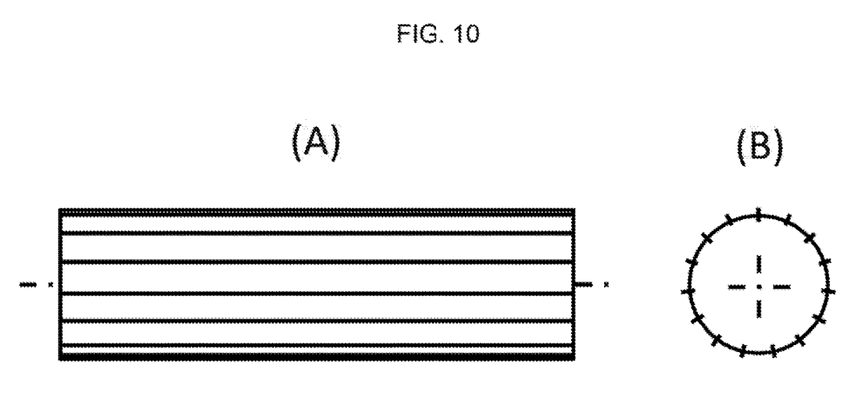
FIG. 10 illustrates an example of a parallel blade roller according to an example, where

A cutter roller includes 15 linear blades (edge angle of 20 degrees, thickness of 0.3 mm, and made of alloy tool steel) attached, at a regular 12.6 mm-pitch, to the outer circumference of the roller shown in FIG. 10, the linear blades extending in parallel to the axial direction of the roller. The linear blades protrude by 1 mm. The outside diameter of a circle connecting the edges of the blades is Φ 60 mm.

The hitting mechanism includes, as shown in FIG. 1 and FIG. 3, a rotation shaft, a pair of rotation plates connected to the rotation shaft, and wire-shaped hitting pieces (piano wires of Φ 1.2 mm) arranged at 16 positions on a virtual circle of Φ 200 mm on the rotation plate. Although not shown here, the hitting mechanism can be rotated at an intended speed by a driving mechanism separately installed.

(Apparatus Structure 2) [Helical Blade Roller]

This apparatus structure 2 has the above-described apparatus structure 1 as a basic structure, while having the shape of a cutter roller changed.

Figure 8:
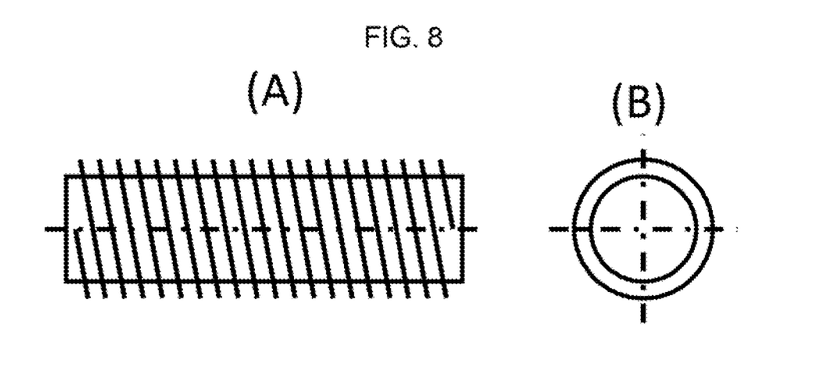
FIG. 8 illustrates an example of a helical blade roller according to an example, where

The cutter roller in this structure is different from a linear blade roller shown in FIG. 4 or FIG. 10, and has a shape of, as shown in FIG. 8, a roller with a blade (edge angle of 30 degrees and edge height of 1.6 mm) helically wound around the outer circumference of the roller (helix angle of 11 degrees and helix pitch of 2.4 mm [=12.6×tan 11 degrees]). In this helical blade roller cut out from alloy tool steel, the outside diameter of a circle connecting the edge points is Φ 60 mm.

(Apparatus Structure 3) [Including Dispersion Booth Partition Plates]

This apparatus structure 3 includes dispersion booth partition plates, which are not included in the above apparatus structure 1.

As shown in FIG. 1 and FIG. 3, the dispersion booth partition plates are plates made of SUS304 stainless steel with a thickness of 1 mm, arranged at a 100 mm-pitch in the rotation axial direction of the hitting mechanism.

(Apparatus Structure 4) [Needle Hitting Mechanism]

Figure 9:
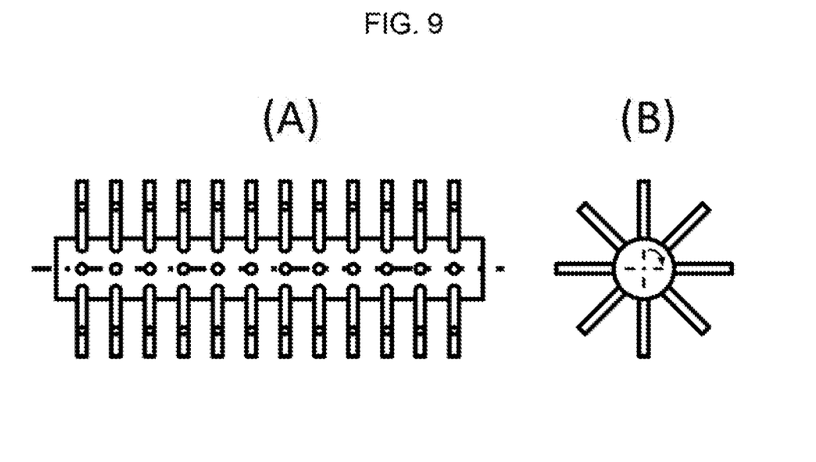
FIG. 9 illustrates an example of a needle hitting mechanism according to a comparative example, where

This apparatus structure 4 has the above-described apparatus structure 1 as a basic structure, while having a hitting mechanism different from that shown in FIG. 1 and FIG. 3. As shown in FIG. 9, the hitting mechanism includes needles (hollow shape with an inner diameter of 2 mm, and made of SUS304 stainless steel) of Φ 4 mm protruding by 70 mm from the outer circumferential surface of a roller-shaped needle shaft (made of aluminum) of Φ 60 mm. The needles are radially and equidistantly arranged at eight positions, and at an equal 40 mm-pitch in the axial direction of the needle shaft. The outside diameter of a circle connecting the needle tips is Φ 200 mm. Although not shown here, the hitting mechanism can be rotated at an intended speed by a driving mechanism separately installed.

(Conditions in Common)
Number of fiber bundles: 36
Filament speed: 20 m/min
Transportation speed of sheet member: 1.48 m/min
Target mat width: 1,500 mm
Mat basis weight: 1,200 g/m²
Cut conditions: fiber length of 12.6 mm (=Φ60×π÷15)
Full width of cutter roller: 1,700 mm
Nip roller: described below
  Outside diameter: 60 mm
  Full width: 1,700 mm
  Material: industrial polyurethane (hardness of 90 degrees)
Pitch of filament introduction to cutter roller: 40.5 mm
Dispersion booth size: described below
  Width: 1,500 mm
  Height: 1,000 mm
  Depth (sheet member transportation direction): 1,300 mm
Partition plate pitch: described below
  Chute partition plate: 100 mm-pitch
  Dispersion booth partition plate: 100 mm-pitch (Evaluation Method)
(1) Basis-Weight Variance [CV %]

Figure 11:
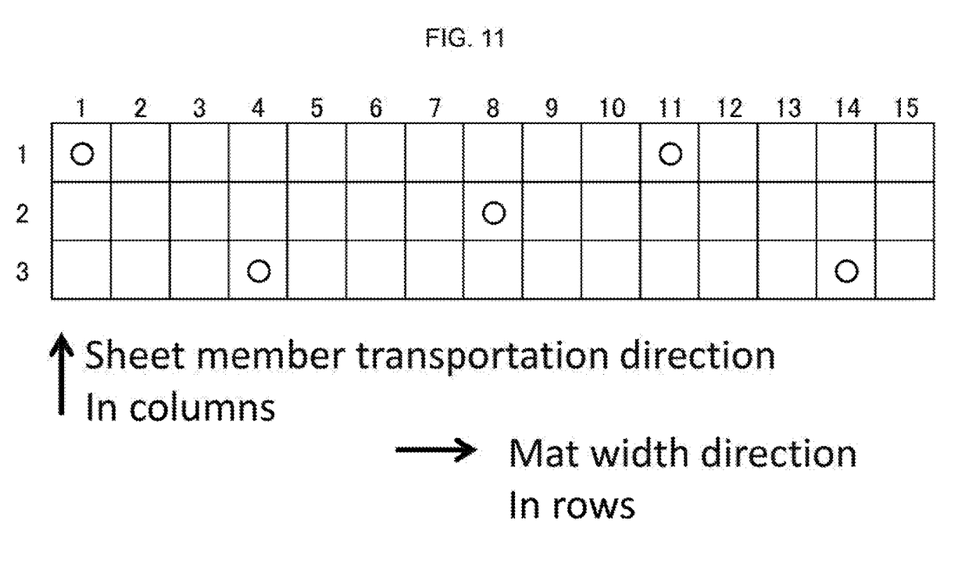
FIG. 11 is a schematic diagram for illustrating a method for cutting a large reinforcing fiber mat into 100 mm-square mats.

The manufactured reinforcing fiber mat is placed on a table covered with a cutter mat, and cut with a rotary cutter into a sheet size with 1500 mm in the mat width direction (direction orthogonal to the sheet-member transportation direction to be parallel to the horizontal direction) and 300 mm in the mat longitudinal direction (sheet transportation direction). Thereafter, as shown in FIG. 11, the reinforcing fiber mat was cut in 15 rows in the width direction and 3 columns in the longitudinal direction into 45 100 mm-square mats, and the 100 mm-square mats were weighed with an electronic balance. The standard deviation and the average for the weight of the 45 mats were calculated, and the value obtained by dividing the standard deviation with the average was defined as "a basis-weight variance [CV %]".

(2) Weight content [%] of Thin Bundles

Among the 45 100 mm-square mats, as marked with circles in FIG. 11, a first mat was selected from the first column and the first row, a second mat was selected from the third column and the fourth row, a third mat was selected from the second column and the eighth row, a fourth mat was selected from the first column and the eleventh row, and a fifth mat was selected from the third column and the fourteenth row. Multiple fiber bundles were collectively picked up with tweezers from the center of each selected 100 mm-square mat, and the group of the fiber bundles was placed on the electronic balance to be weighed. This process was repeatedly performed to pick up 0.6 g of a fiber bundle group from each mat, and the total 3 g of fiber bundle groups from the five mats. Thereafter, bundles are picked up one by one with the tweezers from 3 g of the fiber bundle group, to have their fiber length and weight measured. Thereafter, the number of filaments after the splitting was calculated on the basis of the measured weight and fiber length, the fineness of the fiber bundle of 3.7 g/m, and the number of filaments of 50K before splitting, and "the bundle thickness" was expressed in K. For example, when the fiber length of the picked-up fiber bundle is 12.6 mm, and the weight is 0.1 mg, the number of filaments is 0.107K (=0.0001 g÷(0.0126 m×3.7 g/m×50K). From the bundle thickness measured and calculated in the above-described method, the weight content of the thin bundles smaller than 10K is defined as "the weight content [%] of thin bundles".

(Example 1) [Linear Blade, No Partition Plate, Wires of Φ 1.2, 400 rpm]

Using the above-described fiber bundle, the apparatus structure 1, and other conditions in common, the rotation speed of the hitting-dispersing mechanism was set to 400 rpm to manufacture a reinforcing fiber mat. No distinguished basis-weight variance was visually observed in the obtained mat. The obtained mat included a large number of thin bundles, and was rated as high quality. The results are shown in Table 1.

TABLE 1

| | | Main apparatus Structure | | | Condition | | Result | | |
|---|---|---|---|---|---|---|---|---|---|
| | No. | Cutter structure | Dispersion booth partition plates | Dispersing device structure | Hitting mechanism rotation speed [rpm] | Hitting piece diameter [mm] | Basis weight variance [CV %] | Weight content [%] of thin bundle (less than 10K) | Quality |
| Example 1 | 1 | Linear blade | — | Wire type | 400 | 1.2 | 10 | 91 | Good |
| Example 2 | 1 | Linear blade | — | Wire type | 200 | 1.2 | 8 | 86 | Good |
| Example 3 | 1 | Linear blade | — | Wire type | 800 | 1.2 | 12 | 93 | Good |
| Example 4 | 1 | Linear blade | — | Wire type | 400 | 3 | 15 | 83 | Acceptable |
| Example 5 | 1 | Linear blade | — | Wire type | 400 | 6 | 20 | 80 | Acceptable |
| Example 6 | 2 | Spiral blade | — | Wire type | 400 | 1.2 | 8 | 95 | Good |
| Example 7 | 3 | Linear blade | Included | Wire type | 400 | 1.2 | 6 | 91 | Good |

TABLE 1-continued

| | No. | Cutter structure | Dispersion booth partition plates | Dispersing device structure | Hitting mechanism rotation speed [rpm] | Hitting piece diameter [mm] | Basis weight variance [CV %] | Weight content [%] of thin bundle (less than 10K) | Quality |
|---|---|---|---|---|---|---|---|---|---|
| | | Main apparatus Structure | | | Condition | | Result | | |
| Example 8 | 3 | Linear blade | Included | Wire type | 800 | 1.2 | 6 | 93 | Good |
| Comparative example 1 | 4 | Linear blade | — | Needle type | 400 | — | 32 | 68 | NG |
| Comparative example 2 | 4 | Linear blade | — | Needle type | 800 | — | 35 | 68 | NG |

(Example 2) [200 rpm]

The rotation speed of the hitting mechanism was changed from that in Example 1 to 200 rpm to manufacture a reinforcing fiber mat. No distinguished basis-weight variance was visually observed in the obtained mat. The obtained mat included a large number of thin bundles, and was rated as high quality. The results are shown in Table 1.

(Example 3) [800 rpm]

The rotation speed of the hitting mechanism was changed from that in Example 1 to 800 rpm to manufacture a reinforcing fiber mat. No distinguished basis-weight variance was visually observed in the obtained mat. The obtained mat included a large number of thin bundles, and was rated as high quality. The results are shown in Table 1.

(Example 4) [Hitting Pieces Φ 3]

The hitting pieces were changed from those in Example 1 to stick members (made of SUS304 stainless steel) with a diameter of φ 3 mm to manufacture a reinforcing fiber mat. Basis-weight variance was visually observed at some points in the obtained mat. The obtained mat included thick bundles at some points, and was rated as normal quality. The results are shown in Table 1.

(Example 5) [Hitting Pieces Φ 6]

The hitting pieces were changed from those in Example 1 to stick members (made of SUS304 stainless steel) with a diameter of φ 6 mm to manufacture a reinforcing fiber mat. Basis-weight variance was visually observed at some points in the obtained mat. The obtained mat included thick bundles at some points, and was rated as normal quality. The results are shown in Table 1.

(Example 6) [Helical Blade Roller]

The hitting mechanism was changed from that in Example 1 to a helical blade roller according to the apparatus structure (2) to manufacture a reinforcing fiber mat. No distinguished basis-weight variance was visually observed in the obtained mat. The obtained mat included a large number of thin bundles, and was rated as high quality. The results are shown in Table 1.

(Example 7) [Including Partition Plates]

The hitting mechanism was changed from that in Example 1 to include dispersion booth partition plates according to the apparatus structure (3) to manufacture a reinforcing fiber mat. Scarcely any basis-weight variance was visually observed in the obtained mat. The obtained mat included a large number of thin bundles, and was rated as high quality. The results are shown in Table 1.

(Example 8) [Including Partition Plates, 800 rpm]

The rotation speed of the hitting mechanism was changed from that in Example 7 to 800 rpm to manufacture a reinforcing fiber mat. Scarcely any basis-weight variance was visually observed in the obtained mat. The obtained mat included a large number of thin bundles, and was rated as high quality. The results are shown in Table 1.

(Comparative Example 1) [Needles]

The hitting mechanism was changed from that in Example 1 to the needle hitting mechanism according to the apparatus structure (4) to manufacture a reinforcing fiber mat. Wide basis-weight variance was visually observed throughout in the obtained mat. The obtained mat included a large number of thick bundles, and was rated as low quality. The results are shown in Table 1.

(Comparative Example 2) [Needles, 800 rpm]

The rotation speed of the hitting mechanism was changed from that in comparative example 1 to 800 rpm to manufacture a reinforcing fiber mat. Wide basis-weight variance was visually observed throughout in the obtained mat. The obtained mat included a large number of thick bundles, and was rated as low quality. The results are shown in Table 1.
(Difference between Hitting Mechanisms and Effects of Thickness)

Compared with Example 1, the basis-weight variance was higher, the weight content of thin bundles was significantly lower, and the mat quality was significantly lower in comparative examples 1 and 2. The dispersing devices according to comparative example 1 and 2 include needles. Thus, it is assumed that the fiber bundles slipped between the needles while leaving a large number of fiber bundles without coming into contact with the needles, serving as hitting pieces. In comparative example 2, the rotation speed of the hitting mechanism was increased to increase the chance for the fiber bundles to come into contact with the hitting pieces. However, the weight content of thin bundles failed to increase. It is assumed that the increase of the rotation speed rather enhanced air current that disturbs the fiber bundles, and thus increased the basis-weight variance.

Compared with comparative example 1 or 2, the basis-weight variance was lower and the weight content of thin bundles was higher in examples 4 and 5. However, compared with example 1, the basis-weight variance was wider, the weight content of thin bundles was smaller, and the mat quality was lower.

In examples 4 and 5, the hitting pieces extend in the rotation axial direction of the hitting mechanism. Thus, it is assumed that the hitting pieces had more chances to come into contact with fiber bundles, and the basis-weight variance was reduced compared with comparative example 1 or 2. However, it is assumed that the thick hitting pieces widely disturbed air in the dispersion booth, and the basis-weight variance was increased, compared with example 1. In addition, it is assumed that the thick hitting pieces only push the fiber bundles when coming into contact with the fiber bundles, without exerting a sufficiently large local force for splitting the fiber bundles into thin bundles, so that the weight content of thin bundles was reduced.

Compared with example 4, the basis-weight variance was lower, and the weight content of thin bundles was higher, and thus was rated as high mat quality in examples 1 to 3. Example 1 includes hitting pieces thinner than those in example 4. Thus, it is assumed that accompanying air current resulting from rotation of the dispersion mechanism was reduced, and thus air turbulence causing basis-weight variance was reduced. It is assumed that the thin hitting pieces exerted a sufficiently large local force for splitting the fiber bundles into thin bundles when coming into contact with the fiber bundles, so that the weight content of thin bundles was increased.

Compared with example 4, the basis-weight variance was lower and the weight content of thin bundles was higher, and thus was rated as high mat quality in example 3 where the rotation speed of the dispersion mechanism is increased. It is assumed that the thin hitting pieces enabled to obtain high mat quality with low basis-weight variance and a high weight content of thin bundles.

(Effects of Helical Blade)

Compared with example 1, the basis-weight variance was lower and the weight content of thin bundles was higher, and thus was rated as higher mat quality in example 6. In example 6, the fiber bundles were obliquely cut with the helical blade to have a shape of a parallelogram. Compared with the rectangular fiber bundle cut with the right-angle blades of example 1, it is assumed that the parallelogrammatic fiber bundles of example 6 are split into thinner bundles, because they are apparently longer and thus have more chances to come into contact with the hitting pieces.

(Effects of Partition Plates)

Compared with example 1, the basis-weight variance was much lower, and was thus rated higher mat quality in examples 7 and 8. In example 8, the basis-weight variance was equivalent to that in example 7, although the rotation speed was increased than that in example 7. It is assumed that this is because the partition plates installed in the dispersion booth prevented air current in the rotation axial direction of the hitting mechanism.

EXPLANATION OF SYMBOLS

1: reinforcing fiber bundle
2: cut reinforcing fiber bundle
3: split reinforcing fiber bundle
4: reinforcing fiber mat
10: guide roller
11: nip roller
12: cutter roller
20: chute
21: chute partition plate
30: dispersion booth
31: dispersion booth partition plate
40: hitting mechanism
41: rotation shaft
42: rotation plate
42a: partitioning rotation plate
43: hitting piece
50: sheet member

The invention claimed is:

1. A reinforcing fiber mat manufacturing apparatus, comprising a hitting mechanism that is configured to come into contact with a reinforcing fiber bundle to split the reinforcing fiber bundle into a plurality of pieces, and to disperse the plurality of pieces,
wherein the hitting mechanism includes a rotation shaft, a pair of end rotation plates attached to portions of the rotation shaft apart from each other, and a plurality of hitting pieces arranged to extend in parallel to the rotation shaft between the pair of end rotation plates, and wherein partitioning rotation plates are attached to the rotation shaft between the pair of end rotation plates, and the plurality of hitting pieces are disposed between an adjacent one of the pair of end rotation plates and one of the partitioning rotation plates or between adjacent two of the partitioning rotation plates, wherein the plurality of hitting pieces extend through the partitioning rotation plates.

2. The reinforcing fiber mat manufacturing apparatus according to claim 1,
wherein the pair of end rotation plates have a disk shape, and
wherein the plurality of hitting pieces are arranged to be concentric around the rotation shaft.

3. The reinforcing fiber mat manufacturing apparatus according to claim 1,
wherein the hitting mechanism is disposed in a dispersion booth to which the rotation shaft is attached,
wherein the dispersion booth has a dispersion opening below the hitting mechanism, and
wherein the dispersion booth accommodates a plurality of dispersion booth partition plates extending in a direction orthogonal to an axial direction of the rotation shaft and arranged in the axial direction.

4. The reinforcing fiber mat manufacturing apparatus according to claim 3, wherein the dispersion booth has a fall opening above the hitting mechanism, the fall opening is connected with a chute, and the chute accommodates a plurality of chute partition plates extending in a direction orthogonal to an axial direction of the rotation shaft, and arranged in the axial direction.

5. The reinforcing fiber mat manufacturing apparatus according to claim 1, wherein the reinforcing fiber bundle includes carbon fibers.

6. The reinforcing fiber mat manufacturing apparatus according to claim 1, wherein the hitting pieces have a linear shape with a diameter of smaller than 3 mm.

7. The reinforcing fiber mat manufacturing apparatus according to claim 6, wherein the hitting pieces have the linear shape with a diameter of 1.5 mm or less.

8. The reinforcing fiber mat manufacturing apparatus according to claim 1, wherein the hitting pieces have a circular cross section, a polygonal cross section or a cross section with a shape obtained by mixing a polygon and an arc.

\* \* \* \* \*